(12) United States Patent
Hong et al.

(10) Patent No.: US 11,560,538 B2
(45) Date of Patent: Jan. 24, 2023

(54) BEVERAGE MAKER

(71) Applicant: LG ELECTRONICS INC., Seoul (KR)

(72) Inventors: Jinpyo Hong, Seoul (KR); Youngjoon Kim, Seoul (KR); Kyungbin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 538 days.

(21) Appl. No.: 16/710,265

(22) Filed: Dec. 11, 2019

(65) Prior Publication Data

US 2020/0190448 A1 Jun. 18, 2020

(30) Foreign Application Priority Data

Dec. 17, 2018 (KR) ........................ 10-2018-0163253

(51) Int. Cl.
| | |
|---|---|
| *C12C 11/00* | (2006.01) |
| *C12C 13/10* | (2006.01) |
| *B65D 43/16* | (2006.01) |
| *B65D 85/72* | (2006.01) |
| *A47J 31/44* | (2006.01) |
| *B67D 3/00* | (2006.01) |

(52) U.S. Cl.
CPC ......... *C12C 11/006* (2013.01); *A47J 31/4407* (2013.01); *B65D 43/163* (2013.01); *B65D 85/72* (2013.01); *C12C 13/10* (2013.01); *B65D 2251/1066* (2013.01); *B67D 3/00* (2013.01)

(58) Field of Classification Search
CPC ....................................................... C12C 13/10
See application file for complete search history.

(56) References Cited

U.S. PATENT DOCUMENTS

| | | | | |
|---|---|---|---|---|
| 5,088,470 | A | * 2/1992 | James, Jr. | ........... A47J 37/0786 |
| | | | | 126/41 R |
| 2005/0229788 | A1 | * 10/2005 | White | ...................... A47J 31/00 |
| | | | | 99/323 |
| 2017/0332829 | A1 | * 11/2017 | Kim | ......................... B67D 1/00 |
| 2019/0144804 | A1 | * 5/2019 | Hong | ..................... C12C 11/00 |
| | | | | 99/276 |
| 2019/0153370 | A1 | * 5/2019 | Hong | ..................... C12C 13/10 |

FOREIGN PATENT DOCUMENTS

| | | | | |
|---|---|---|---|---|
| CN | 106852640 | A | * 6/2017 | |
| CN | 107411552 | A | * 12/2017 | ........ A47J 27/21166 |
| CN | 108143293 | A | * 6/2018 | ............. A47J 36/06 |
| CN | 112471907 | A | * 3/2021 | |
| FR | 2866539 | A1 | * 8/2005 | ............. A47J 36/12 |
| KR | 101469067 | B1 | * 12/2014 | ............. F16C 11/04 |

* cited by examiner

*Primary Examiner* — John J Norton
(74) *Attorney, Agent, or Firm* — Ked & Associates

(57) ABSTRACT

A beverage maker may include a fermenter having an opening; a fermentation lid hinged to the fermenter and configured to open and close the opening from above; a hinge shaft connected to the fermentation lid and configured to rotate with the fermentation lid; a rotary gear connected to the hinge shaft; and a gear damper provided at the fermenter and engaged with the rotary gear.

11 Claims, 14 Drawing Sheets

BEVERAGE MAKER

CROSS-REFERENCE TO RELATED APPLICATION(S)

The present application claims priority to Korean Patent Application No. 10-2018-0163253, filed in Korea on Dec. 17, 2018, the entire contents of which is incorporated herein for all purposes by this reference.

BACKGROUND

1. Field

A beverage maker, and more particularly, a beverage maker that makes a fermented beverage are disclosed herein.

2. Background

A beverage is a general term for a drinkable liquid, such as an alcoholic drink or tea, for example. For example, beverages may be classified into various categories, such as water (drink) for quenching thirst, a fruit juice having a unique aroma and flavor, a cooling beverage providing a refreshing feeling, a favorite beverage capable of providing a stimulant effect, or an alcoholic beverage having an alcoholic effect.

A representative example of theses beverages is beer. Beer is an alcoholic drink produced by making and filtering juice from malt, which is made by sprouting barley, and then adding hops and fermenting it.

Customers can purchase ready-made products made and sold by beer manufacturers or may make beer at home (hereinafter "homemade beer") made by fermenting the materials of beer at home or in a bar. Homemade beer may be produced in a variety of types and may be produced to fit the tastes of customers, in comparison with ready-made products.

Water, malt, hops, yeast, and a flavor additive, for example, may be the materials of beer. Yeast may ferment the malt when it is added to the malt, and may help to produce alcohol and carbonic acid. A flavor additive may be an additive substance that enhances the flavor of beer, such as fruit, syrup, and vanilla beans, for example.

In general, the process of making homemade beer may include a total of three steps or operations, a step or operation of making a malt juice, a fermentation step or operation, and an aging step or operation, and two to three weeks may be taken from the making of a malt juice to the aging step.

Maintaining an optimal temperature in the fermentation operation is important for homemade beer, and the simpler the homemade beer is to make, the greater the user convenience. Recently, beverage makers that make it possible to easily make homemade beer at home or in a bar are increasing being used, and for those beverage makers to safely and simply make beer.

BRIEF DESCRIPTION OF THE DRAWINGS

Embodiments will be described in detail with reference to the following drawings in which like reference numerals refer to like elements, and wherein.

DETAILED DESCRIPTION

Figure 1:
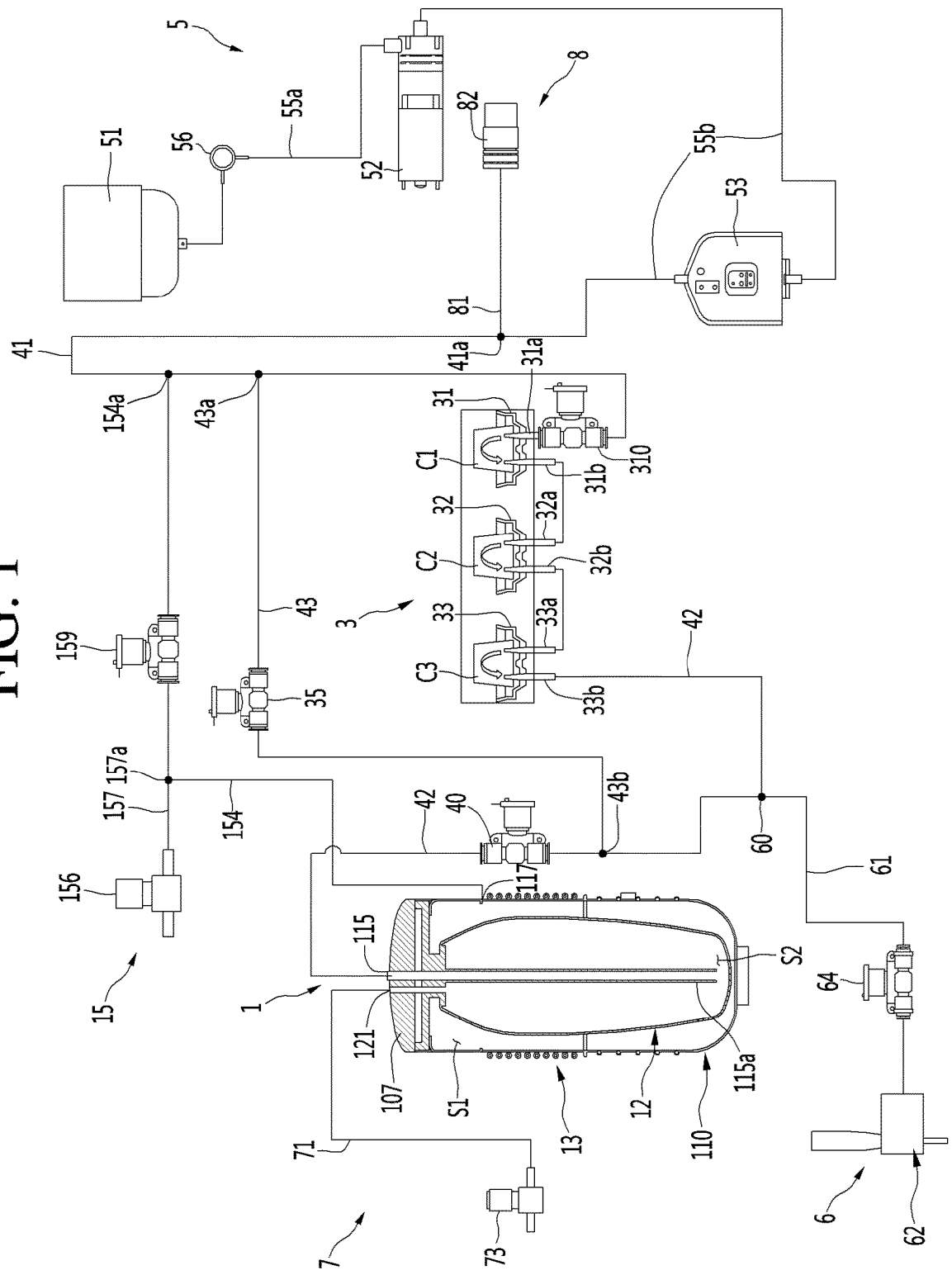
FIG. 1 is a view showing the configuration of a beverage maker according to an embodiment.

Hereinafter, embodiments are described with reference to drawings. Wherever possible, like or the same reference numerals have been used to indicate like or the same elements, and repetitive disclosure has been omitted.

Hereinafter, embodiments are described with reference to drawings. Wherever possible, like or the same reference numerals have been used to indicate like or the same elements, and repetitive disclosure has been omitted.

Although beer is exemplified as a beverage that is made using a beverage maker according to embodiments, the kind of beverage that can be made using the beverage maker is not limited to beer and various kinds of beverages may be made using the beverage maker according to embodiments.

FIG. 1 is a view of a beverage maker according to an embodiment. The beverage maker may include a fermentation module 1. Fermentation of a beverage may proceed in the fermentation module 1.

The beverage maker may include a fluid supply module 5. The fluid supply module 5 may supply a fluid, such as water.

The beverage maker may include a materials feeder 3 having material receivers 31, 32, and 33 in which materials for making a beverage may be accommodated. The beverage maker may include first and second main channels 41 and 42 that connect the fluid supply module 5 and the fermentation module 1.

The beverage maker may include a beverage dispenser 6 that dispenses the beverage made in the fermentation module 1. The beverage dispenser 6 may be connected to the second main channel 42, whereby the beverage taken out of the fermentation module 1 may be guided to the beverage dispenser 6 through a portion of the second main channel 42.

The beverage maker may further include a gas discharger 7. The gas discharger 7 may be connected to the fermentation module 1, thereby being able to discharge gas produced in the process of making a beverage.

The beverage maker may further include an air injector 8 that injects air. The air injector 8 may be connected to the fluid supply module 5 or the first main channel 41. The air injector may include an air pump 82.

The beverage maker may further include an air adjuster 15 that adjusts pressure between an inner wall of a fermenter 110 and an outer side of a fermentation container 12.

The fermentation module 1 may include the fermenter 110 having an opening 170 (see FIG. 5) and a fermentation lid 107 that opens/closes the opening 170.

An internal space S1 in which the fermentation container 12 may be accommodated may be formed in the fermenter 110. That is, the fermentation container 12 may be accommodated in the fermenter 110.

The fermentation container 12 may be a container that is separately provided to prevent beverage materials and a completed beverage from sticking to the inner wall of the fermenter 110. The fermentation container 12 may be detachable from the fermenter 110. The fermentation container 12 may be seated in the fermenter 110 and may ferment a beverage in the fermenter 110, and when it finishes being used, it may be taken out of the fermenter 110.

The fermentation container 12 may be a pack in which materials for making a beverage are accommodated. The fermentation container 12 may be made of a flexible material, so it may be easily inserted into the fermenter 110 and contract and expand, depending on pressure. However, the fermentation container 12 may include a polyethylene terephthalate (PET) material, for example.

A fermentation space S2 in which beverage materials may be accommodated and a beverage made may be formed in the fermentation container 12. The fermentation container 12 may be smaller than the internal space S1 of the fermenter 110.

Figure 5:
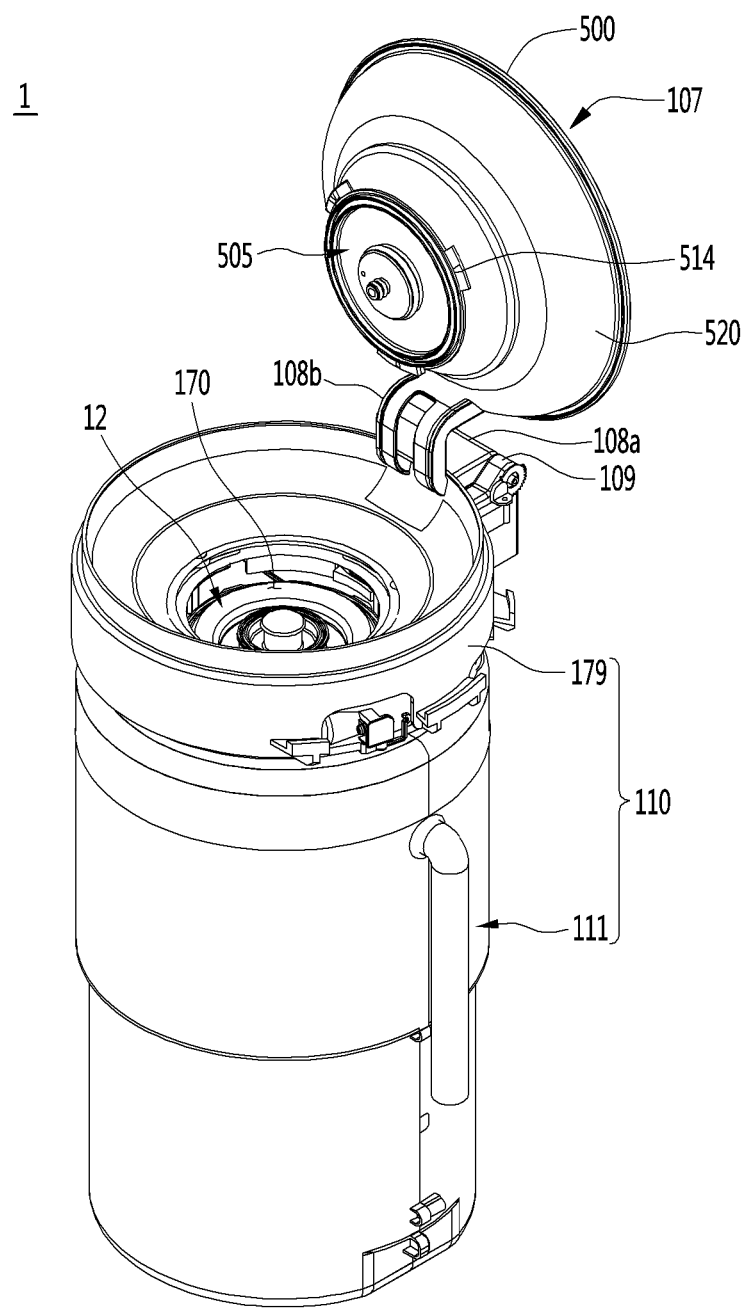
FIG. 5 is a perspective view when a fermentation lid of the fermentation module shown in FIG. 4 is open.

The fermentation container 12 may be inserted into and accommodated with materials accommodated therein in the fermenter 110 through the opening 170 (see FIG. 5). The fermentation container 12 may be inserted into the fermenter 110 and accommodated in the fermenter 110 with the fermentation lid 107 open.

The fermentation lid 107 may close tightly the fermenter 110 after the fermentation container 12 is inserted into the fermenter 110. The fermentation container 12 may help fermentation of materials in a state in which it is accommodated in the internal space S1 closed tightly by the fermenter 110 and the fermentation lid 107. The fermentation container 12 may be expanded by internal pressure thereof while a beverage is made. When the beverage in the fermentation container 12 is taken out and air is supplied between an inner side of the fermenter 110 and an outer side of the fermentation container 12, the fermentation container 12 may be compressed by the air in the fermenter 110.

The fermentation lid 107, which closes tightly an inside of the fermenter 110, may be disposed over the fermenter 110 and may close the opening 170. The fermentation lid 107 may have a main channel connecting portion 115 connected with the main channel, more particularly, the second main channel 42. The main channel connecting portion 115 may communicate with the fermentation space S2 of the fermentation container 12.

A tube 115a elongated in a vertical direction and communicating with the main channel connecting portion 115 may be provided in the fermentation container 12. A lower end of the tube 115a may be adjacent to a floor of the fermentation container 12, and when a beverage is taken out, the beverage in the fermentation container 12 may be easily suctioned into the tube 115a.

The fermenter 110 may be provided with a temperature adjuster 13. The temperature adjuster 13 may change an internal temperature of the fermenter 110. The temperature adjuster 13, which heats or cools the fermenter 110, may adjust the temperature of the fermenter 110 to an optimal temperature for beverage fermentation.

The temperature adjuster 13 may include at least one of a refrigeration cycle apparatus or a heater. However, the temperature adjuster 13 is not limited thereto and may include a thermoelectric element (TEM), for example.

For example, the refrigeration cycle apparatus of the temperature adjuster 13 may adjust the temperature of the fermenter 110 by cooling the fermenter 110. The refrigeration cycle apparatus may include, for example, a compressor, a condenser, and expansion device, and an evaporator. The evaporator may be disposed in contact with an outer side of the fermenter 110. The evaporator may be configured as an evaporation tube wound on the outer side of the fermenter 110.

The main channels 41 and 42 may include first channel 41, which may connect the fluid supply module 5 and the material feeder 3 and second main channel 42, which may connect the material feeder 3 and the fermentation module 1. That is, the first main channel 41 may guide a fluid, such as water supplied from the fluid supply module 5 to the material feeder 3 and the second main channel 42 may guide a mixture of materials from the material feeder 3 and the fluid to the fermentation module 1. A first end 41a of the first main channel 41 may be connected to the fluid supply module 5 and a second end thereof may be connected to the material feeder 3.

A material supply valve 310 that opens/closes the first main channel 41 may be disposed in the first main channel 41. The material supply valve 310 may be a component included in the material feeder 3.

The material supply valve 310 may be opened when additives accommodated in material receivers 31, 32, and 33 are to be put in, thereby opening the first main channel 41.

A first end of the second main channel 42 may be connected with the main channel connecting portion 115 of the fermentation module 1 and a second end thereof may be connected to the material feeder 3. A main valve 40 that opens/closes the second main channel 42 may be disposed in the second main channel 42.

The main valve 40 opens when fluid is supplied, air is injected, or an additive is supplied into the fermentation container 12, thereby opening the second main channel 42. The main valve 40 closes when the fermenter 110 is cooled, fermentation proceeds in the fermentation container 12, or a beverage is aged and kept in the fermentation container 12, thereby closing the second main channel 42 and closing tightly the fermentation container 12. The main valve 40 may open the second main channel 42 by opening when a beverage is dispensed by the beverage dispenser 6, and the beverage in the fermentation container 12 may be moved to the beverage dispenser 6 through the main valve 40.

The main channels 41 and 42 may be configured as one continuous channel when the beverage maker does not include the material feeder 3. When the beverage maker includes the material feeder 3, the beverage maker may further include the bypass channel 43 configured such that fluid or air bypasses the material receivers 31, 32, and 33.

The bypass channel 43 may connect the first main channel 41 and the second main channel 42 while bypassing the material receivers 31, 32, and 33. A first end 43a of the bypass channel 43 may be connected to the first main channel 41 and a second end 43b thereof may be connected to the second main channel 42. The first end 43a of the bypass channel 43 may be connected to a portion between the fluid supply module 3 and the material supply valve 310 in the first main channel 41, and the second end 43b may be connected to a portion between the main valve 40 and the material feeder 3 in the second main channel 42.

A bypass valve 35 that opens/closes the bypass channel 43 may be disposed in the bypass channel 43. The bypass valve 35 may open when fluid supplied from the fluid supply module 5 or air injected out of the air injector 8 is supplied into the fermentation container 12, thereby opening the bypass channel 43.

When beer is made using the beverage maker, the materials for making beer may include water, malt, yeast, hops, and/or a flavor additive, for example. The beverage maker may include both of the material feeder 3 and the fermentation container 12, and the materials for making a beverage may be separately accommodated in the material feeder 3 and the fermentation container 12. Some of the materials for making a beverage may be accommodated in the fermentation container 12 and other materials may be accommodated in the material feeder 3. The materials accommodated in the material feeder 3 may be supplied into the fermentation container 12 together with a fluid, such as water supplied from the fluid supply module 5 and may be mixed with materials accommodated in the fermentation container 12.

A main material necessary for making a beverage may be accommodated in the fermentation container 12 and additives added to the main materials may be accommodated in the material feeder 3. The additives accommodated in the material feeder 3 may be mixed with the fluid, such as water supplied from the fluid supply module 5 and supplied into the fermentation container 12 together, and may be mixed with the main material accommodated in the fermentation container 12.

The main material accommodated in the fermentation container 12 may include a material which is larger in content than other materials. For example, when beer is made, the main material may be malt of malt, yeast, hops, and a flavor additive. Further, the additives accommodated in the material feeder 3 may be other materials except for the malt, for example, yeast, hops, and a flavor additive.

The beverage maker may include the fermentation container 12 without including the material feeder 3. In this case, the main material may be accommodated in the fermentation container 12 and a user may directly put additives into the fermentation container 12.

When the beverage maker includes both of the material feeder 3 and the fermentation container 12, it is possible to more simply make a beverage, and hereinafter, an example including both of the material feeder 3 and the fermentation container 12 is described for convenience. However, it should be noted that embodiments are not limited to the case that includes both of the material feeder 3 and the fermentation container 12.

The materials in the fermentation container 12 may ferment, as time passes, and a finished beverage made in the fermentation container 12 may flow into the second main channel 42 through the main channel connecting portion 115 and may be dispensed by flowing to the beverage dispenser 6 from the second main channel 42.

Materials for making a beverage may be accommodated in the material feeder 3, and the material feeder 3 may be configured to pass fluid, such as water supplied from the fluid supply module 5. For example, when the beverage to be made in the beverage maker is beer, the materials that are accommodated in the material feeder 3 may be yeast, hops, and a flavor additive, for example.

The materials accommodated in the material feeder 3 may be directly accommodated in the material receivers 31, 32, and 33 formed in the material feeder 3. At least one material receiver 31, 32, and 33 may be formed in the material feeder 3. A plurality of material receivers 31, 32, and 33 may be formed in the material feeder 3, and in this case, the plurality of material receivers 31, 32, and 33 may be separated from each other.

Inlets 31a, 32a, and 33a through which fluid flows in and outlets 31b, 32b, and 33b through which fluid flows may be formed at the material receivers 31, 32, and 33, respectively. Fluid flowing into the inlet of one material receiver may be mixed with the materials in the material receiver and then may be discharged to the outlet.

The materials accommodated in the material feeder 3 may be accommodated in material containers C1, C2, and C3. The material containers C1, C2, and C3 may be accommodated in the material receivers 31, 32, and 33, and the material receivers 31, 32, and 33 may be referred to as "material container mounts". The material containers C1, C2, and C3 may be configured as capsules or pods; however, embodiments are not limited thereto.

When materials are accommodated in the material containers C1, C2, and C3, the material feeder 3 may be configured such that the material containers C1, C2, and C3 may be seated therein and removed therefrom. Further, the material feeder 3 may be configured as a material container kit assembly in which the material containers C1, C2, and C3 are separably accommodated.

For example, a first additive, a second additive, and a third additive may be accommodated in the material feeder 3. The first additive may be yeast, the second additive may be hops, and the third additive may be a flavor additive. The material feeder 3 may include a first material container mount 31 in which the first material container C1 accommodating the first additive therein is accommodated, a second material container mount 32 in which the second material container C2 accommodating the second additive therein is accommodated, and a third material container mount 33 in which the third material container C3 accommodating the third additive therein is accommodated.

The materials in the material receivers or the material containers C1, C2, and C3 may be extracted by pressure of the fluid, such as water supplied from the fluid supply module 5. When the materials are extracted by pressure, the fluid supplied from the fluid supply module 5 to the first main channel 41 may be mixed with the materials while passing through the material receivers or the material containers C1, C2, and C3, and the materials accommodated in the material receivers or the material containers C1, C2, and C3 may flow with the fluid into the second main channel 42.

Different kinds of additives may be separately accommodated in the material feeder 3. For example, when beer is made, the additives accommodated in the material feeder 3 may be yeast, hops, and a flavor additive, for example, and they may be separately accommodated.

When a plurality of material receivers is formed in the material feeder 3, the plurality of material receivers 31, 32, and 33 may be connected in series or in parallel with respect to a flow direction of fluid. For example, as shown in FIG. 1, a plurality of material receivers is connected in series, the first main channel 41 may be connected to the inlet 31a of the first material container mount 31, the outlet 31b of the first material container mount 31 may communicate with the inlet 32a of the second material container mount 32, the outlet 32b of the second material container mount 32 may communicate with the inlet 33a of the third material container mount 33, and the outlet 33b of the third material container mount 33 may be connected to the second main channel 42.

The fluid supply module 5 may include a tub 51, a pump 52 that pumps up fluid, such as water in the tub 51, and a heater 53 that heats the fluid pumped up by the pump 52. For example, the pump 52 may include a gear pump. The gear pump may be a rotary pump, that is, a pump that pumps liquid or fluid using engagement of two of the same rotors. The internal structure of a gear pump is well known, so it is not described herein.

The tub 51 and the pump 52 may be connected to a tub outlet channel 55a. The fluid in the tub 51 may be suctioned into the pump 52 through the tub outlet channel 55a. The pump 52 and the first end 41a of the first main channel 41 may be connected to a fluid supply channel 55b and the fluid discharged from the pump 52 may be guided to the first main channel 41 through the fluid supply channel 55b.

A flowmeter 56 that measures a flow rate of the fluid, such as water from the tub 51 may be disposed in the tub outlet channel 55a or the fluid supply channel 55b. Further, the tub 51 may be provided with a water level sensor (not shown) that measures an amount of fluid, such as water stored in the tub 51. The heater 53 may be disposed in the fluid supply channel 55b.

When the pump 52 is driven, the fluid in the tub 51 may be suctioned into the pump 52 through the tub outlet channel 55a and the fluid discharged from the pump 52 may be heated by the heater 53 while flowing through the fluid supply channel 55b, and may be guided to the first main channel 41.

The beverage dispenser 6 may be connected to the second main channel 42. The beverage dispenser 6 may include a beverage dispensing channel 61 that communicates with the fermentation module 1, a beverage dispensing valve 64 disposed in the beverage dispenser channel 61, and a dispenser 62 connected to the beverage dispenser channel 61.

The beverage dispensing channel 61 may communicate with the fermentation module 1 by being connected to the second main channel 42. The beverage dispensing channel 61 may communicate with the fermentation space S2 of the fermentation container 12. A first end 60 of the beverage dispensing channel 61 may be connected to the second main channel 42 between the material feeder 3 and the main valve 40 and a second end thereof may be connected to the dispenser 62.

The beverage dispensing valve 64 which opens/closes the beverage dispensing channel 61 may be disposed in the beverage dispensing channel 61. The beverage dispensing valve 64 may include a solenoid valve.

The beverage dispensing valve 64 may be opened when a beverage is dispensed, and the beverage dispensing valve 64 may be kept closed when a beverage is not dispensed. The beverage having passed through the beverage dispensing valve 64 may be guided to the dispenser 62.

A user may adjust dispensing of a beverage by manipulating the dispenser 62. When a user opens the dispenser 62, a beverage may be dispensed from the dispenser 62. The operation of opening/closing of the dispenser 62 is in connection with the beverage dispensing valve 64, so when a user opens the dispenser 62, the beverage dispensing valve 64 may be opened, and when a user closes the dispenser 62, the beverage dispensing valve 64 may be closed.

The gas discharger 7 may be connected to the fermentation module 1 and discharge gas produced in the fermentation container 12. The gas discharger 7 may include a gas discharge channel 71 connected to the fermentation module 1, and a gas discharge valve 73 connected to the gas discharge channel 71. The gas discharge channel 71 may be connected to the fermentation module 1, more particularly, to the fermentation lid 107. The fermentation lid 107 may have a gas discharge channel connecting portion 121 to which the gas discharge channel 71 may be connected.

The gas discharge channel connecting portion 121 may communicate with the fermentation space S2 of the fermentation container 12. The gas in the fermentation container 12 may flow to the gas discharge channel 71 through the gas discharge channel connecting portion 121 and may be discharged to the gas discharge valve 73 that is open.

With the beverage maker according to embodiments, it is possible to uniformly mix a fluid, such as water and malt by injecting air into the fermentation container 12 using the air injector 8, and in this process, bubbles generated from the liquid-state malt may be discharged outside through the gas discharge channel 71 and the gas discharge valve 73 over the fermentation container 12. Further, the gas discharge valve 73 may be kept closed in the fermentation operation of a beverage.

The air injector 8 may be connected to the fluid supply channel 55b or the first main channel 41 and may inject air. Air injected into the first main channel 41 from the air injector 8 may be injected into the fermentation container 12 sequentially through the bypass channel 43 and the second main channel 42. Accordingly, stirring or aeration may be performed in the fermentation container 12.

Further, the air injected into the first main channel 41 from the air injector 8 may remove remaining fluid or residue while passing through the material container mounts 31, 32, and 33. Accordingly, it is possible to keep the material container mounts 31, 32, and 33 clean.

The air injector 8 may include an air injection channel 81 connected to the fluid supply channel 55b or the first main channel 41, and air pump 82 connected to the air injection channel 81. The air pump 82 may pump up air into the air injection channel 81.

The air adjuster 15 may adjust pressure between the inner wall of the fermenter 110 and the outer side of the fermentation container 12. The air adjuster 15 may supply air between the fermentation container 12 and the inner wall of the fermenter 110 or may remove air from between the fermentation container 12 and the inner wall of the fermenter 110.

The air adjuster 15 may include an air supply channel 154 connected to the fermentation module 1, and an exhaust channel 157 connected to the air supply channel 154 to discharge air to the outside. A first end 154a of the air supply channel 154 may be connected to the first main channel 41 and a second end thereof may be connected to the fermentation module 1.

The fermentation module 1 may have an air supply channel connecting portion 117 to which the air supply channel 154 may be connected, and the air supply channel connecting portion 117 may communicate with the space between the inner wall of the fermenter 110 and the outer side of the fermentation container 12. The air supply channel connecting portion 117 may be formed at the fermenter 110 or the fermentation lid 107.

The air injected into the first main channel 41 from the air injector 8 may be guided between the outer side of the fermentation container 12 and the inner wall of the fermenter 110 through the air supply channel 154. As described above, the air supplied in the fermenter 110 may press the fermentation container 12 between the outer side of the fermentation container 12 and the inner wall of the fermenter 110.

The beverage in the fermentation container 12 may be pressed by the fermentation container 12 pressed by the air, and may flow to the second main channel 42 through the main channel connecting portion 115 when the main valve 40 and the beverage dispensing valve 64 are opened. The beverage flowing to the second main channel 42 from the fermentation container 12 may be dispensed outside through the beverage dispenser 6. On the other hand, the exhaust channel 157 may function as an air exhaust passage that discharges air between the fermentation container 12 and the fermenter 110 to the outside in cooperation with a portion of the air supply channel 154.

The air supply channel 154 may include a first channel extending from the first end 154a connected with the first main channel 41 to a connecting portion 157a to which the exhaust channel 157 is connected, and a second channel extending from the first end 154a to which the exhaust channel 157 is connected to the air supply channel connecting portion 117. The first channel may be an intake channel that guides the air pumped by the air pump 82 to the second channel. Further, the second channel may be an intake/exhaust compatible channel that supplies air, which has passed through the intake channel, between the fermenter 110 and the fermentation container 12 or that guides the air from between the fermenter 110 and the fermentation container 12 to the exhaust channel 157.

An exhaust valve 156 that opens/closes the exhaust channel 157 may be connected to the exhaust channel 157. The exhaust valve 156 may be opened such that the air between the fermentation container 12 and the fermenter 110 may be discharged outside, when the fermentation container 12 expands while a beverage is made.

The air adjuster 15 may further includes an air supply valve 159 that connects/disconnects the air that is pumped up from the air pump 82 and supplied between the fermentation container 12 and the fermenter 110. The air supply valve 159 may be disposed in the air supply channel 154. The air supply valve 159 may be disposed between the first end 154a connected with the first main channel 41 and the connecting portion 157a connected with the exhaust channel 157, in the air supply channel 154.

Figure 2:
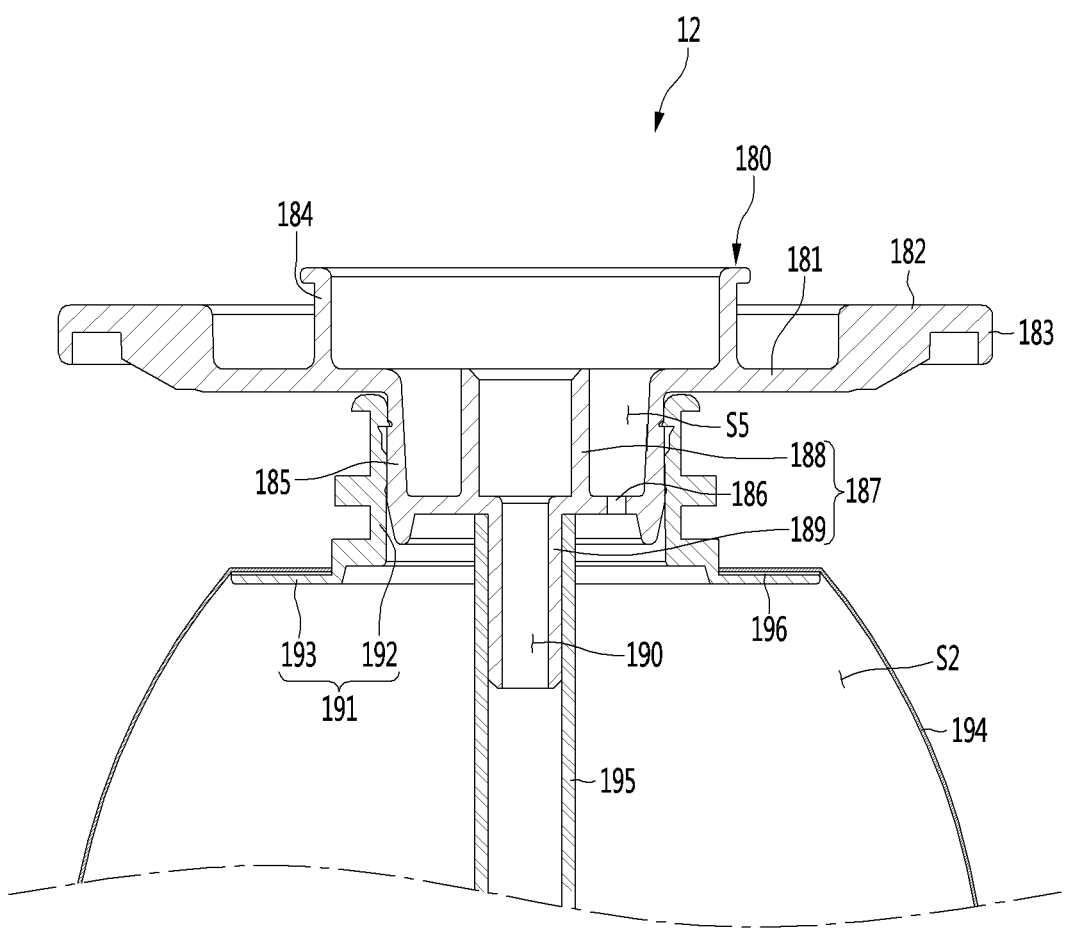
FIG. 2 is a cross-sectional view of a fermentation container according to an embodiment.
Figure 3:
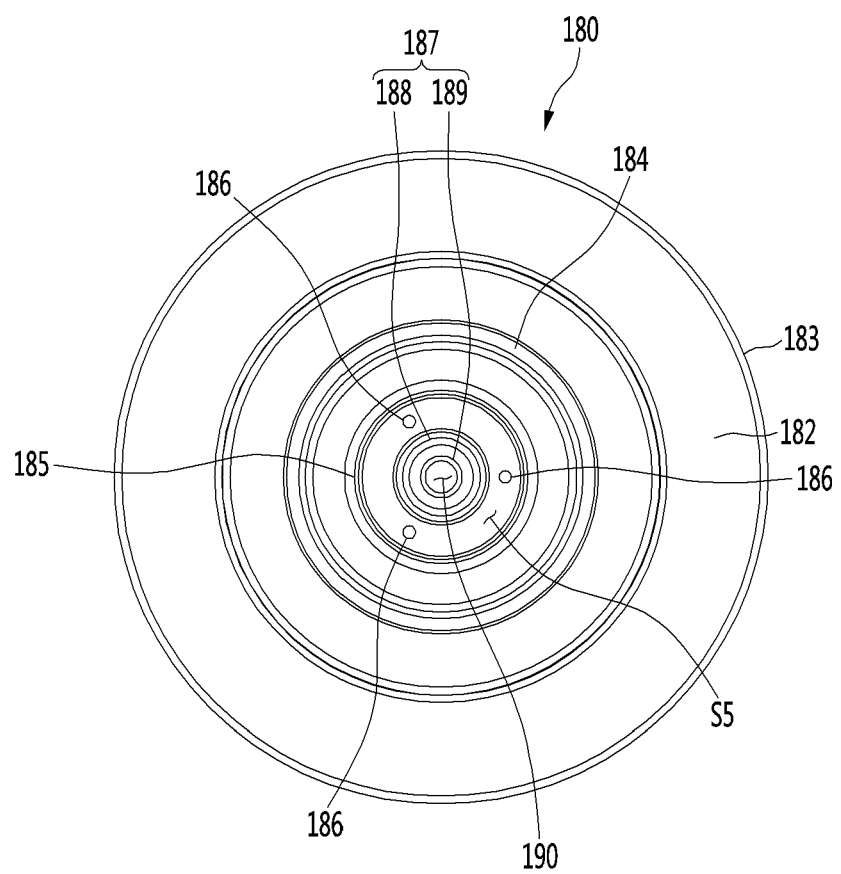
FIG. 3 is a plan view of the fermentation container shown in FIG. 2.

FIG. 2 is a cross-sectional view of a fermentation container according to an embodiment. FIG. 3 is a plan view of the fermentation container shown in FIG. 2.

The fermentation container 12 may include a container body 180 seated on a top of the fermenter 110, and a flexible container 194 coupled to the container body 180 and having the fermentation space S2. The fermentation container 12 may further include a tube 195 connected to a lower portion of the container body 180 and extending up to a lower portion in the flexible container 194.

The container body 180 may be formed as a single unit or may be formed by combining a plurality of members. For example, the container body 180 may include a main body 181 and a bonding body 191 that is combined with the main body 181 and to which the flexible container 194 is bonded.

An outer hollow portion 184 may be formed at the container body 180, more particularly, the main body 181. The outer hollow portion 184 may protrude upward from the container body 180.

Further, a seating portion 183 that is seated on the fermenter 110 may be formed at the container body 180. The seating portion 183 may be formed at a circumferential portion 182 of the main body 181. The circumferential portion 182 may be positioned outside of the outer hollow portion 184 in a radial direction of the container body 180.

A recession 185 recessed downward may be formed at the container body 180. The recession 185 may be formed by recessing downward an inside of the outer hollow portion 184. The recession 185 may form a recessed space S5 that communicates with the inside of the outer hollow portion 184. An inner diameter of the recessed space S5 may be smaller than an inner diameter of the outer hollow portion 184.

The recessed space S5 may refer to a space between an inner circumference of the recession 185 and an outer circumference of an inner hollow portion 187. The inner hollow portion 187 which communicates with the fermentation space S2 may be formed at the container body 180. The inner hollow portion 187 may be formed at the recession 185 of the main body 181. A diameter of the inner hollow portion 187 may be smaller than a diameter of the recession 185.

The inner hollow portion 187 may form an inner channel 190 in cooperation with the tube 195. Fluid, such as water, air, or a mixture thereof may be supplied into the fermentation space S2 of the flexible container 194 through the inner channel 190. When a finished beverage is dispensed, the beverage accommodated in the fermentation space S2 may be dispensed from the flexible container 194 through the inner channel 190.

The inner hollow portion 187 may have a first connecting portion 188 that protrudes upward from the recession 185, and a second connecting portion 189 that protrudes downward. An outer circumferential surface of the first connecting portion 188 may be spaced apart from an inner circumferential surface of the recession 185. The first connecting portion 185 may communicate with the main channel connecting portion 115 formed at the fermentation lid 107. The recession 185 may be separably connected to the second connecting portion 189.

The tube 195 may be elongated downward to be adjacent to a bottom surface of the flexible container 194. Accordingly, when a finished beverage is dispensed, the beverage in a lower portion of the flexible container 194 may be easily dispensed through the tube 195.

The tube 195 may be a flexible tube and may be folded with the flexible container 194, so there is an advantage that the fermentation container 12 may be stored in a compact size.

At least one gas exhaust hole 186 through which gas in the fermentation space S2 may be discharged may be formed at the container body 180. The gas exhaust hole 186 may communicate with the beverage-making space S2 in the flexible container 194.

The gas exhaust hole 186 may extend vertically through a floor of the recession 185 of the main body 181. The gas exhaust hole 186 may be formed outside of the inner hollow portion 187 a radial direction of the container body 180.

In the fermentation operation of a beverage, an internal pressure of the flexible container 194 may be increased by fermentation gas generated by the beverage, and when the pressure is excessive, the flexible container 194 may explode or break. The fermentation gas may be discharged out of the flexible container 194 through the gas exhaust hole 186, whereby the internal pressure of the flexible container 194 may be maintained at an appropriate level.

The bonding body 191 may be separably fastened to the main body 181. Accordingly, a user may replace the tube 195, or the bonding body 191 and the flexible container 194 and mount new ones to the main body 181.

The bonding body 191 may include a fastening portion 192 and a bonding portion 193. The fastening portion 192 may have a substantially hollow cylindrical shape and may be fastened to the main body 181. The recession 185 of the main body 181 may be fastened by being inserted into the fastening portion 192. An inner circumferential surface of the fastening portion 192 may be fitted and fastened to the outer circumferential surface of the recession 185.

The bonding portion 193 may be formed in ring-shaped plate shape. The bonding portion 193 may extend outward from a lower end of the fastening portion 192 in a radial direction of the fastening portion 192. The bonding portion 193 may be positioned under the main body 181 and may face a bottom surface of the main body 181.

The flexible container 194 may be bonded to a top surface or a bottom surface of the bonding portion 193. The flexible container 194 may be thermally bonded to the bonding portion 193.

A thermal bonding layer 196 may be provided between the flexible container 194 and the bonding portion 193. The thermal bonding layer 196 may be a thermosetting paint that makes thermal bonding between the flexible container 194 and the bonding portion 193 easy.

Figure 4:
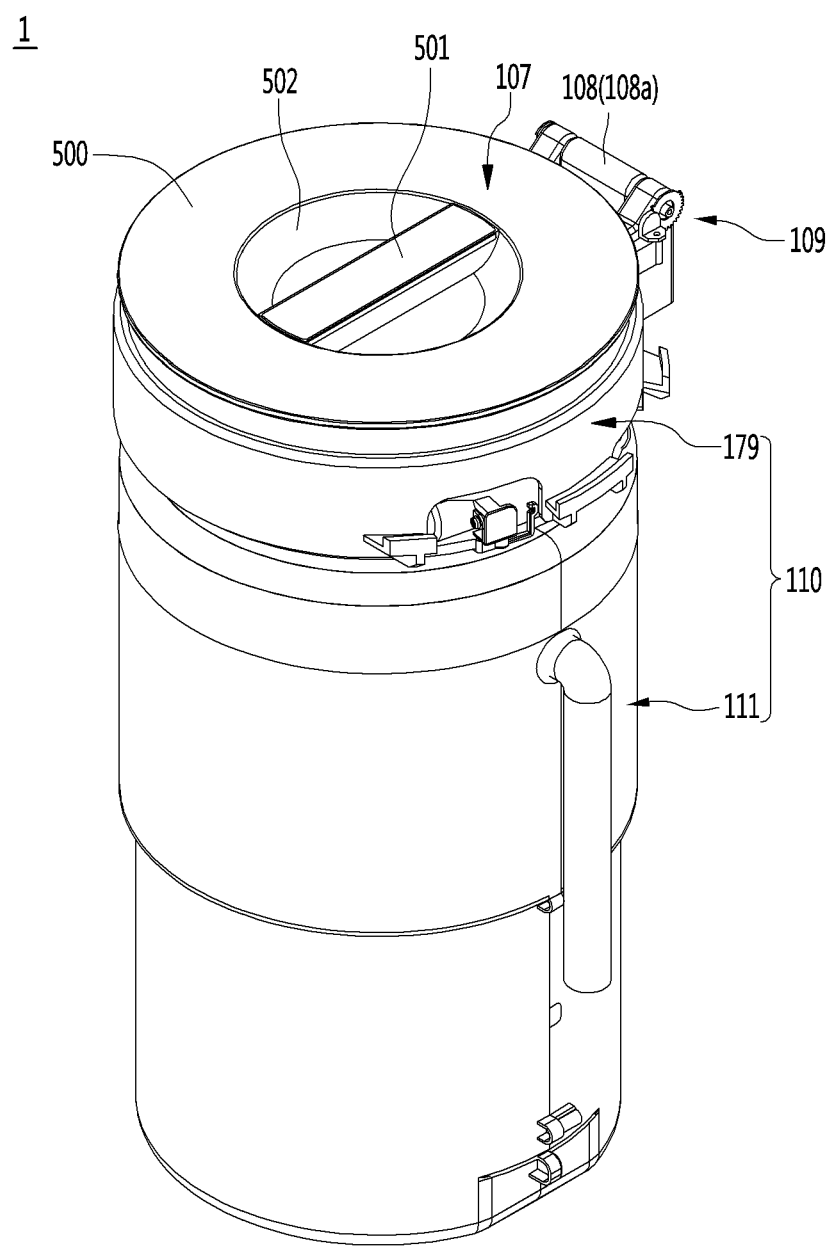
FIG. 4 is a perspective view of the fermentation module according to an embodiment.
Figure 6:
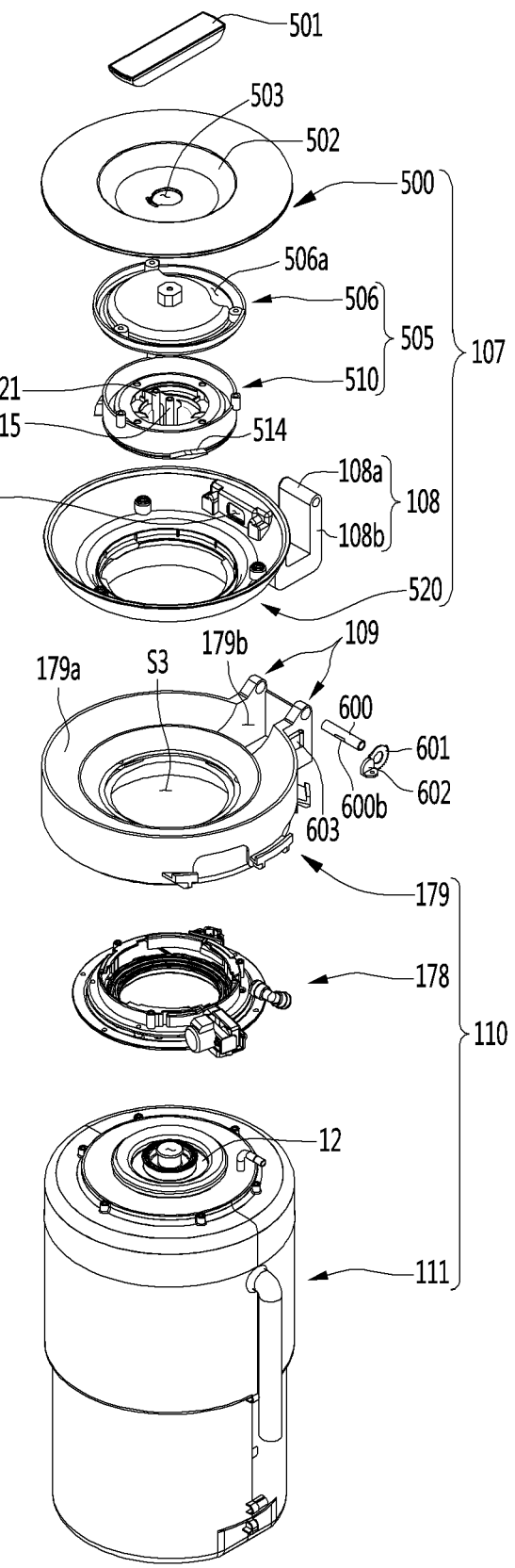
FIG. 6 is an exploded perspective view of the fermentation module according to an embodiment.

FIG. 4 is a perspective view of a fermentation module according to an embodiment. FIG. 5 is a perspective view when the fermentation lid of the fermentation module shown in FIG. 4 is open. FIG. 6 is an exploded perspective view of the fermentation module according to an embodiment.

As described above, the fermentation module 1 may include the fermenter 110 having the opening 170 and the fermentation lid 107 that opens/closes the opening 170. The fermenter 110 may include a fermentation tank 111, a restricting body 178, and a lid seat body 179.

The space S1 in which the fermentation container 12 may be inserted may be formed in the fermentation tank 111. That is, the fermentation container 12 may be inserted into the fermentation tank 111 and fermentation of a beverage may proceed in the fermentation space S1 of the fermentation container 12.

The restricting body 178 may restrict an opening/closing operation of the fermentation lid 107. A rotary body 505 included in the fermentation lid 107 may be restricted or released by the restricting body 178, depending on a rotational direction thereof. The restricting body 178 may be fastened to the fermentation tank 111 over the fermentation tank 111.

The lid seat body 179 may be disposed over the fermentation tank 111 and may support the fermentation lid 107 from under the fermentation lid 107. A lid seat space S3 may be formed in the lid seat body 179. At least a portion of the fermentation lid 107 may be positioned and seated in the lid seat space S3. An inner diameter of the lid seat space S3 may decreases in a downward direction or may be maintained at a predetermined level.

A seat surface 179b on which the fermentation lid 107 may be seated may be formed at the lid seat body 179. The seat surface 179b may be formed as a curved surface, whereby a contact area between the fermentation lid 107 and the lid seat body 179 increases, so even if the internal pressure of the fermenter 110 increases, it is possible to prevent gas, for example, from leaking between the fermentation lid 107 and the lid seat body 179.

An avoiding portion 179b for avoiding interference with a hinge body 108 of the fermentation lid 107 may be formed at the lid seat body 179. The avoiding portion 179b may include a space between a pair of hinge shaft support portions or supports 108 and a space formed by cutting a portion of the seat surface 179a.

When the fermentation lid 107 is seated on the lid seat body 179, the hinge body 108 may be positioned in the avoiding portion 179b. Accordingly, the hinge body 108 cannot interfere with the lid seat body 179 and the opening/closing operation of the fermentation lid 107 cannot be interrupted.

The shaft support portions 109 may rotatably support the hinge shaft 600. The shaft support portions 109 may be formed on the lid seat body 109. That is, the shaft support portions 109 may include a protruding portion that protrudes rearward from the lid seat body 109 and a shaft insertion hole in which the hinge shaft 600 may be inserted at the protruding portion.

A pair of the shaft support portions 109 may be provided. The pair of shaft support portions 109 may be spaced apart from each other horizontally, that is, to the left and right. The hinge shaft 600 may be inserted in any one of the shaft support portions 109 and may be inserted in the other shaft support portion 109 through a hinge portion 108a of the fermentation lid 107.

The fermentation lid 107 may be hinged to the fermenter 110, that is, to the lid seat body 179 by the hinge shaft 600. The hinge shaft 600 may form a hinge shaft of the fermentation lid 107 and may rotate with the fermentation lid 107.

A rotary gear 601 may be connected to the hinge shaft 600 and may be engaged with a gear damper 602. With this configuration, it is possible to prevent the fermentation lid 107 from being rapidly closed, and the fermentation lid 107 may be more stably rotated, thereby being able to minimizing shaking of the fermentation lid 107. This will be described hereinafter.

The fermentation lid 107 may include a top cover 500, a lid body 520, a rotary body 505, and the hinge body 108. The top cover 500 may form a top surface of the fermentation lid 107. The top cover 500 may have a substantially disc shape and may have a rotatable handle 501. The handle 501 may be installed in an installation portion 502 recessed downward from the top cover 500.

A through-hole 503 may be formed in the top cover 500 and the handle 501 may be fastened to the rotary body 505 through the through-hole 503. Accordingly, the handle 501 may rotate with the rotary body 505.

The lid body 520 may be seated on the lid seat body 179. An open top surface of the lid body 520 may be covered by the top cover 500. The lid body 520 may form a circumferential portion of the fermentation lid 107. The lid body 520 may be formed in a hollow cylindrical shape a diameter of which decreases downward or is maintained at a predetermined level.

An outer circumferential surface of the lid body 520 may be a curved surface corresponding to the seat surface 179b of the lid seat body 179.

The hinge body 108 may be disposed behind an outer circumference of the lid body 520. The hinge body 108 may include a hinge portion 108a fastened to the hinge shaft 600, and a hinge connecting portion 108b that connects the hinge portion 108A to the lid body 520.

The hinge portion 108a may be positioned outside of the lid body 520. That is, the hinge portion 108a may be positioned behind the lid body 520.

The hinge shaft 600 may be inserted into the hinge portion 108a. The hinge shaft 600 inserted into the hinge portion 108a may be fastened to the hinge portion 108a by a fastener C (see FIG. 11), whereby the hinge shaft 600 and the fermentation lid 107 may rotate together.

The hinge connecting portion 108b may connect the hinge portion 108a and the lid body 520. The hinge connecting portion 108b may have a shape that is bent at least one time. For example, the hinge connecting portion 108b may include a first connecting portion that extends downward from the hinge portion 108a, a second connecting portion that extends forward from a lower end of the first connecting portion, and a third connecting portion that extends upward from a front end of the second connecting portion and connected to the outer circumference of the lid body 520.

When the fermentation lid 107 is seated on the lid seat body 179, the hinge connection portion 108b may be positioned in the avoiding portion 179b formed at the lid seat body 179.

The rotary body 505 may be rotatably mounted on the lid body 520. The rotary body 505 may be disposed under the top cover 500.

A portion of an upper portion of the rotary body 505 may be positioned inside of the lid body 520. The rotary body 505 may be fastened to the handle 501 of the top cover 500, thereby being able to rotate with the handle 501.

The rotary body 505 may be restricted by or released from the restricting body 178, depending on the rotational direction. That is, when a user rotates the handle 501 in a first direction, the rotary body 505 may be restricted by the restricting body 178 and the fermentation lid 107 may be closed tightly to the fermenter 110. In contrast, when a user rotates the handle 501 in a second direction, the rotary body 505 may be released from the restricting body 178 and the fermentation lid 107 may be opened.

The rotary body 505 may include an upper cover 506 fastened to the top cover 500, and a hollow body 510 fastened to the upper cover 506. The hollow body 510 may press down the fermentation container 12 mounted on the fermentation tank 111.

A channel connecting portion 515 that communicates with the fermenter 110, that is, the fermentation space S1 in the fermentation container 12 may be formed at the hollow body 510. The channel connecting portion 515 may include a main channel connecting portion 115, and a gas discharge channel connecting portion 121.

A top surface of the hollow body 510 may be open and the open top surface of the hollow body 510 may be covered by the upper cover 506. Accordingly, the channel connecting portion 515 formed at the hollow body 510 may be protected by the upper cover 505.

At least a portion including a lower end of an outer circumference of the hollow body 510 may face an inner circumference of the restricting body 178 in the radial direction, and a locking portion 514 may be formed at the portion. That is, the locking portion 514 protruding radially outward from the outer circumference of the hollow body 510 may face the inner circumference of the restricting body 178. The locking portion 514 may be locked in the vertical direction to a locking step 551 (see FIG. 7) formed at the restricting body 178.

The upper cover 506 may be fastened to the handle 501 through the through-hole 503 formed at the top cover 500. The upper cover 506 may be formed in a substantially disc shape and may cover the open top surface of the hollow body 510.

The upper cover 506 may be fastened to the hollow body 510, and the upper cover 506 and the hollow cover 510 may rotate together. The lid inner space S6 (see FIG. 7) may be formed between the upper cover 506 and the hollow body 510, and the channel connecting portion 515 may be positioned in the lid inner space S6.

An opening 520c through which the channels 42 and 71 connected to the channel connecting portion 515 pass may be formed at the lid body 520. That is, the second main channel 42 (see FIG. 1) connected to the main channel connecting portion 115 and the gas discharge channel 71 (see FIG. 1) connected to the gas discharge channel connecting portion 121 may pass through the opening 520c.

The channels 42 and 71 may be inserted in a shaft hole 600a (see FIG. 11) formed at the hinge shaft 600 and may be inserted in the hinge connecting portion 108b through a channel through-hole 600b. An internal space that connects the channel through-hole 600b of the hinge shaft 600 and the opening 520c of the lid body 520 may be formed at the hinge connecting portion 108b. That is, the internal space of the hinge connecting portion 108b may be a channel guide space that guides the channel entering the channel through-hole 600b to the opening 520c.

Further, an open portion 506a that prevents interference with the channel may be formed at the upper cover 506. Accordingly, the second channel 42 and the gas discharge channel 71 may enter the lid inner space S6 through the opening 520c and the open portion 506a from outside of the fermentation module 1, and may be connected to the main channel connecting portion 115 and the gas discharge channel connecting portion 121, respectively.

Figure 7:
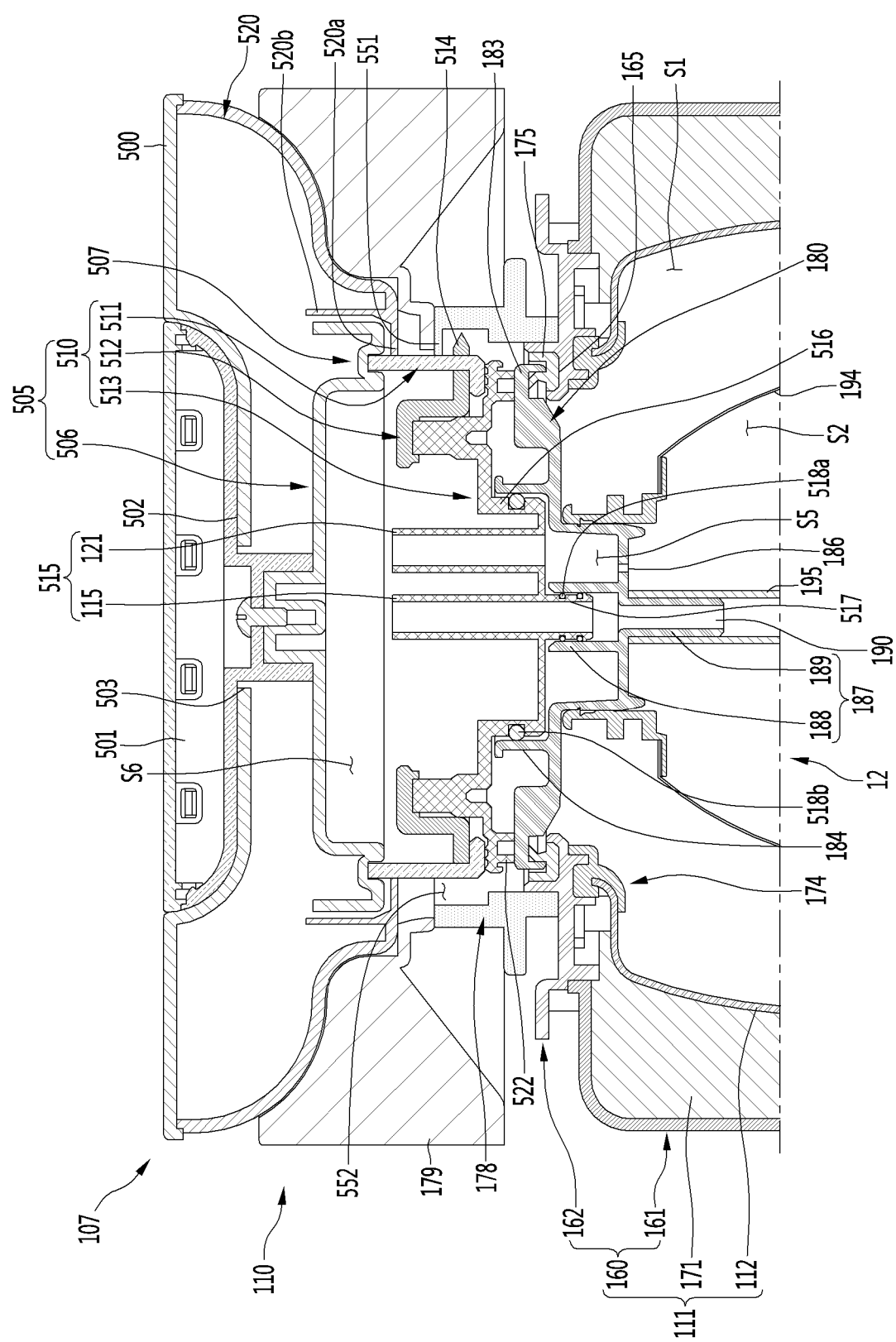
FIG. 7 is a cross-sectional view showing an inside of the fermentation module according to an embodiment.
Figure 8:
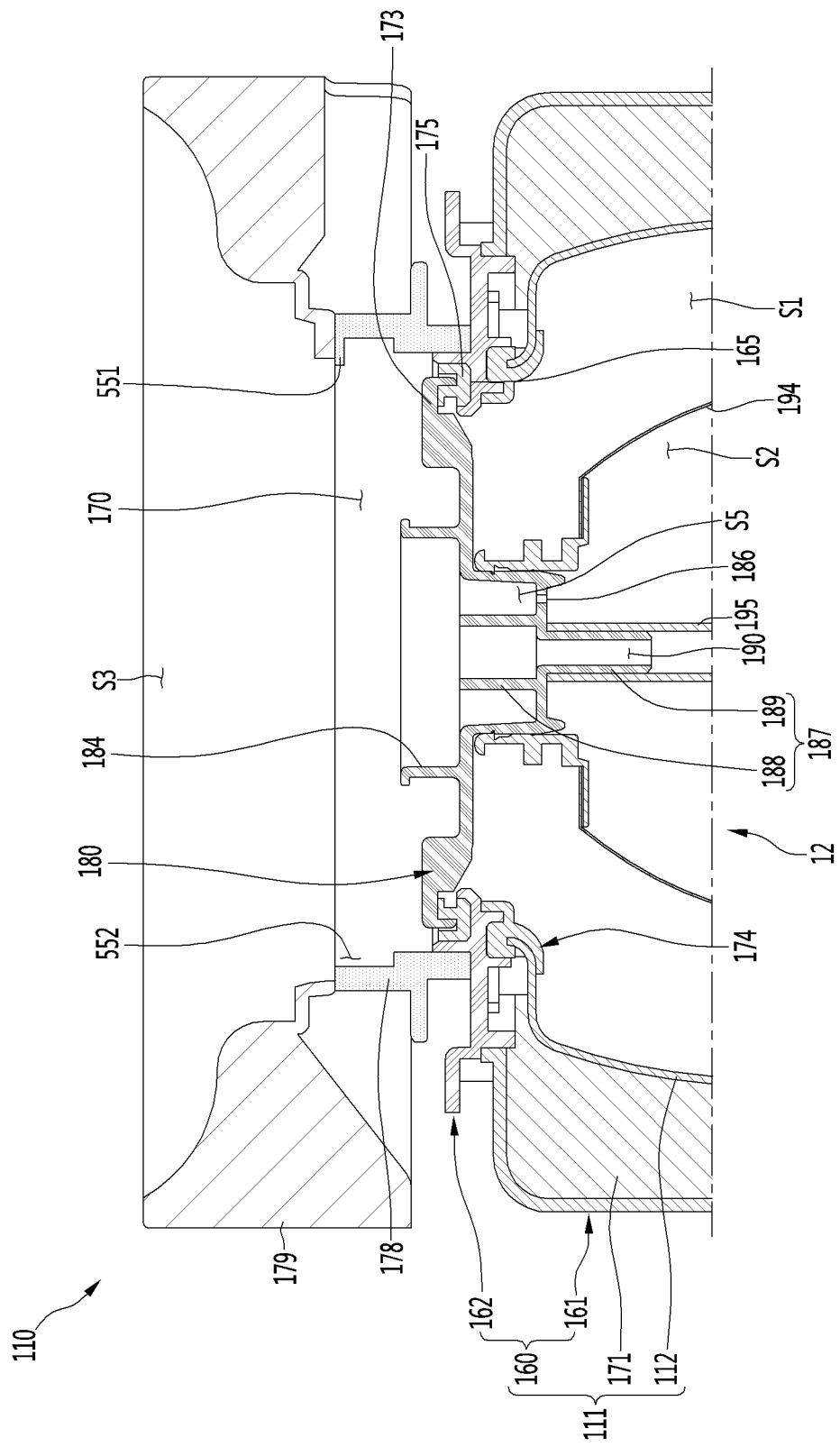
FIG. 8 is a cross-sectional view when the fermentation lid of the fermentation module shown in FIG. 7 is open.

FIG. 7 is a cross-sectional view showing an inside of the fermentation module according to an embodiment. FIG. 8 is a cross-sectional view when the fermentation lid of the fermentation module shown in FIG. 7 is open.

The fermentation tank 111 may include a case 160, an inner tank 112 accommodated in the case 160, and a thermal insulating portion 171 positioned between the case 160 and the inner tank 112. The case 160 may include a case main body 161, and a bracket 162 fastened to an upper portion of the case main body 161. The case main body 161 may configure an external appearance of the fermentation module 1.

The bracket 162 may be formed substantially in a ring shape and may be fastened to the case main body 161 over the case main body 161. Further, the bracket 162 may be fastened to the restricting body 178 under the restricting body 178.

A seat portion or seat 165 on which the container body 180 of the fermentation container 12 may be seated may be formed at the fermentation tank 111. The seat portion 165 may be formed at the bracket 162. The seating portion 183 of the fermentation container 12 may be seated on the seat portion 165.

A first sealing member or seal 175 may be mounted on the seat portion 165, and the seating portion 183 of the container body 180 may be seated on the first sealing member 175. The seat portion 165 may be referred to as a "sealing member mount".

The inner tank 112 may be fastened to the bracket 162 and accommodated in the case main body 161. A second sealing member or seal 174 may be disposed on a bottom surface of the bracket 162 and may seal a gap between the inner tank 112 and the bracket 162.

The internal space S1 which may communicate with the opening portion 170 may be formed in the inner tank 112 and may be a space in which the fermentation container 12, that is, the flexible container 194 may be accommodated. That is, the fermentation container 12 may be inserted into the internal space S1 of the inner tank 112 through the opening 170.

The thermal insulating portion 171 may be positioned between the inner tank 112 and the case 160. The thermal insulating portion 171 may maintain a temperature in the inner tank 112 by surrounding the fermenter 110.

The restricting body 178 may restrict the rotary body 505 of the fermentation lid 107 in the vertical direction. The restricting body 178 may have a substantially hollow cylindrical shape and may be positioned over the fermentation tank 111. The restricting body 178 may be fastened to the fermentation tank 111, that is, the bracket 162. An inside of the restricting body 178 may form the opening 170 that communicates with the internal space S1 of the inner tank 112.

Grooves 552 from which the locking portion 514 of the hollow body 510 may be separated and locking steps 551 to which the locking portion 514 may be locked may be alternately formed on the inner circumference of the restricting body 178.

When the fermentation lid 107 moves down and closes tightly the opening 170, the locking portion 514 may be positioned under the grooves 552 through the grooves 552. In this state, when the rotary body 505 is rotated a predetermined angle in a first direction, the locking portion 514 may move under the locking step 551. Accordingly, the locking portion 514 may be locked to the locking step 551, so the fermentation lid 107 may be restricted in the vertical direction.

When the rotary body 505 is rotated a predetermined angle in a second opposite direction with the fermentation lid 107 restricted to the restricting body 178, the locking portion 514 may move under the grooves 552. In this case, the locking portion 514 may move up through the grooves 552, and the fermentation lid 107 may be released in the vertical direction.

The fermentation lid 107, that is, the lid body 520 may be seated on the lid seat body 179. The lid seat body 179 may be disposed over the fermentation tank 111. The lid seat body 179 may be fastened to the restricting body 178 or the case 160.

The lid seat space S3 may be formed at the lid seat body 179, and the fermentation lid 107 may be at least partially positioned and seated in the lid seat space S3. The lid seat space S3 may be positioned over the opening 170 of the fermenter module 111 and may communicate with the opening 170.

The fermentation lid 107 may open/close the opening 170 of the fermenter 110. The fermentation lid 107 may cover the opening 170 by being inserted into the lid seat space S3 formed at the lid seat body 179. The fermentation lid 107 may fix the fermentation container 12 by pressing down the container body 180 of the fermentation container 12 seated in the fermentation tank 111.

As described above, the fermentation lid 107 may include the top cover 500, the lid body 520, and the rotary body 505. The top cover 500 may cover the lid body 520 from above and may have the rotatable handle 501.

The installation portion 502 in which the handle 501 may be installed may be formed at the top cover 500. The installation portion 502 may be recessed downward from a top surface of the top cover 500. A recessed depth of the installation portion 502 may correspond to a vertical height of the handle 501. The handle 501 may rotate in a state in which it is installed in the installation portion 502.

The through-hole 503 may be formed at the installation portion 502 of the top cover 500 and a center shaft of the handle 501 may be fitted in the through-hole 503. The handle 501 may rotate about the center shaft. The rotary body 505 may be positioned under the top cover 500 and may rotate with the handle 501.

As described above, the rotary body 505 may include the upper cover 506 and the hollow body 510. The upper cover 506 may be positioned under the top cover 500 and may be positioned in the lid body 520.

A hollow body connecting portion 507 connected with an upper end portion or end of the hollow body 510, that is, an upper end portion or end of the outer body 511 may be formed at the upper cover 506. The hollow body connecting portion 507 may be fitted on the upper end portion of the hollow body 510 over the hollow body 510.

The upper cover 506 may form the lid inner space S6 in cooperation with the hollow body 510. The lid inner space S6 may be formed between the upper cover 506 and the hollow body 510. The lid inner space S6 may be a space that a channel connected to the channel connecting portion 515 enters.

The hollow body 510 may be positioned under the upper cover 506 and may rotate with the handle 501 and the upper cover 506. The hollow body 510 may include an outer body 511, an inner body 512 positioned inside of the outer body 511, and a channel body 513 fastened to the inner body 512.

The outer body 511 may have a substantially hollow cylindrical shape. The outer body 511 may form a circumferential portion of the hollow body 510.

At least one locking portion 514 may be formed on an outer circumference of the outer body 511. The locking portion 514 may be positioned under the locking steps 551 or the grooves 552 formed on the inner circumference of the restricting body 178.

When the locking portion 514 is positioned under the locking steps 551, the fermentation lid 107 cannot be opened while restricted by the restricting body 178. In contrast, when the locking portion 514 is positioned under the grooves 552, the fermentation lid 107 may be opened when released from the restricting body 178.

An upper end portion or end of the outer body 511 may be connected to the hollow body connecting portion 507 of the upper cover 506. The inner body 512 may be disposed inside of the outer body 511. The inner body 512 may function as a bracket that connects the outer body 511 and the channel body 513. The channel connecting body 513 may be fastened to the inner body 512.

A container body pressing portion 522 may be formed at the channel connecting body 513. The container body pressing portion 522 may protrude downward from an edge of a bottom surface of the channel connecting body 513. The container body pressing portion 522 may press down the container body 180, that is, the circumferential portion 182 of the container body 180 (see FIG. 2). Accordingly, the container body 180 may be fixed to the fermentation tank 111.

At least one channel connecting portion 515 may be formed at the channel connecting body 513. The channel connecting portion 515 may protrude from the channel connecting body 513 to the lid inner space S6. That is, the channel connecting portion 515 may protrude upward from the channel connecting body 513.

The channel connecting portion 515 may include the main channel connecting portion 115 to which the second main channel 42 (see FIG. 1) may be connected, and the gas discharge channel connecting portion 121 to which the gas discharge channel 71 (see FIG. 1) may be connected. Further, a container body connecting portion 516 connected with the container body 180 of the fermentation container 12 seated in the fermentation tank 111 may be formed at the channel connecting body 513.

The container body connecting portion 516 may protrude downward from the channel body 513. An outer circumference of the container body connecting portion 516 may be fitted on an inner circumference of the outer hollow portion 184 of the container body 180, thereby being connected with the container body 180. An O-ring may be disposed between the container body connecting portion 516 and the outer hollow portion 184.

The gas discharge channel connecting portion 121 may protrude upward from the container body connecting portion 516. The gas discharge channel connecting portion 121 may be positioned over the recessed space S5 of the container body 180. That is, the gas discharge channel connecting portion 121 may communicate with the recessed space S5. Accordingly, the fermentation space S2 in the fermentation container 12 may communicate with the gas discharge channel connecting portion 121 through the gas discharge hole 186. The gas in the fermentation container 12 may be taken out to the recessed space S5 through the gas discharge hole 186 and may be discharged to the gas discharge channel 71 (see FIG. 1) through the gas discharge channel connecting portion 121.

The main channel connecting portion 115 may protrude upward from the container body connecting portion 516. An inner channel connecting portion 517 that communicates with the main channel connecting portion 115 and protrudes downward may be formed at the container body connecting portion 516.

The inner channel connecting portion 517 may be fitted and connected to the inner hollow portion 187 of the container body 180, that is, the first connecting portion 188. An O-ring may be disposed between the inner channel connecting portion 517 and the first connecting portion 188.

Accordingly, the fermentation space S2 in the fermentation container 12 may communicate with the main channel connecting portion 115 through the inner channel 190. Fluid guided to the second main channel 42 (see FIG. 1) may flow into the fermentation space S2 sequentially through the main channel connecting portion 115, the inner channel 190, and the tube 195. Further, the finished beverage in the fermentation space S2 may be discharged to the second main channel 42 (see FIG. 1) sequentially through the tube 195, the inner channel 190, and the main channel connecting portion 115.

The lid body 520 may be seated on the lid seat body 179. The open top surface of the lid body 520 may be covered by the top cover 500. The lid body 520 may form a circumferential portion of the fermentation lid 107.

An upper cover anti-separating portion 520a and an upper cover accommodating portion 520b may be formed at the lid body 520. The upper cover anti-separating portion 520a may form a bottom surface of the lid body 520.

The upper cover anti-separating portion 520a may be positioned over the edge portion 508 of the upper cover 506. The upper cover anti-separating portion 520a may vertically face the edge portion 508 of the upper cover 506.

The upper cover anti-separating portion 520a may radially face the hollow body 510, that is, the outer circumference of the outer body 511 forming the circumferential portion of the hollow body 510. Accordingly, the upper cover anti-separating portion 520a may prevent the upper cover 506 from separating under the lid body 520 and may prevent the outer body 511 from bending radially outward.

The upper cover accommodating portion 520b may protrude upward from the upper cover anti-separating portion 520a. The upper cover accommodating portion 520b may have a substantially hollow cylindrical shape.

The upper cover accommodating portion 520b may be positioned radially outside of the edge portion 508 of the upper cover 506. The upper cover accommodating portion 520b may radially face the edge portion 508 of the upper cover 506. That is, the upper cover accommodating portion 520b may surround the outer circumference of the upper cover 506.

Figure 9:
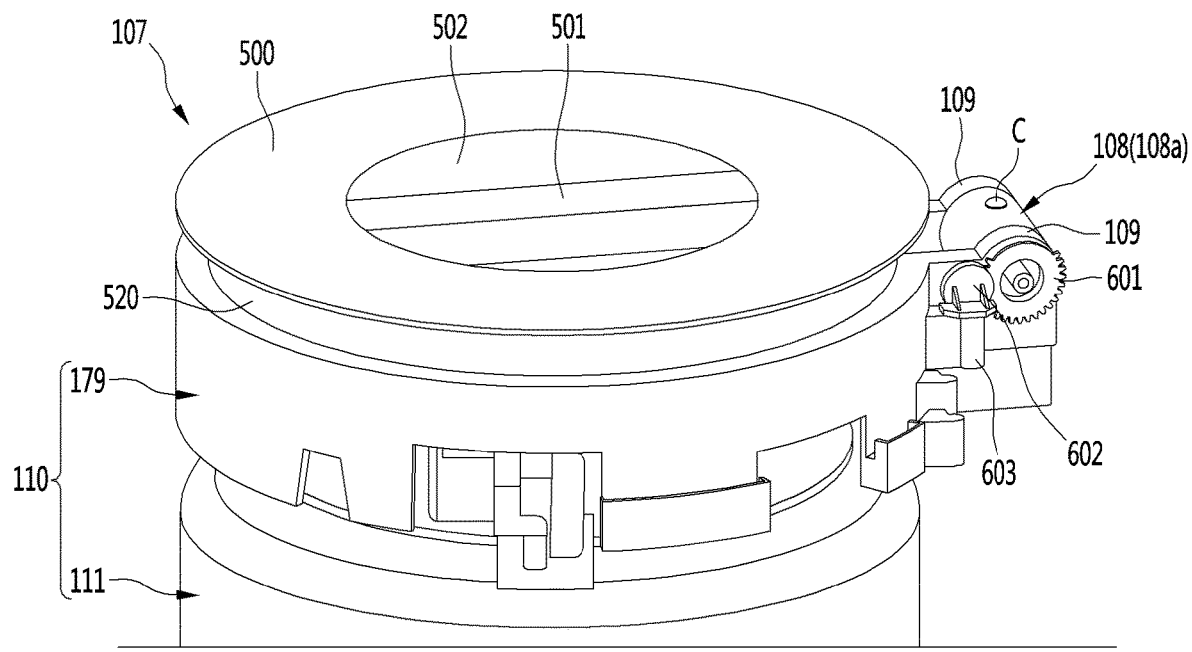
FIG. 9 is a view enlarging and showing an upper portion of the fermentation module according to an embodiment.
Figure 10:
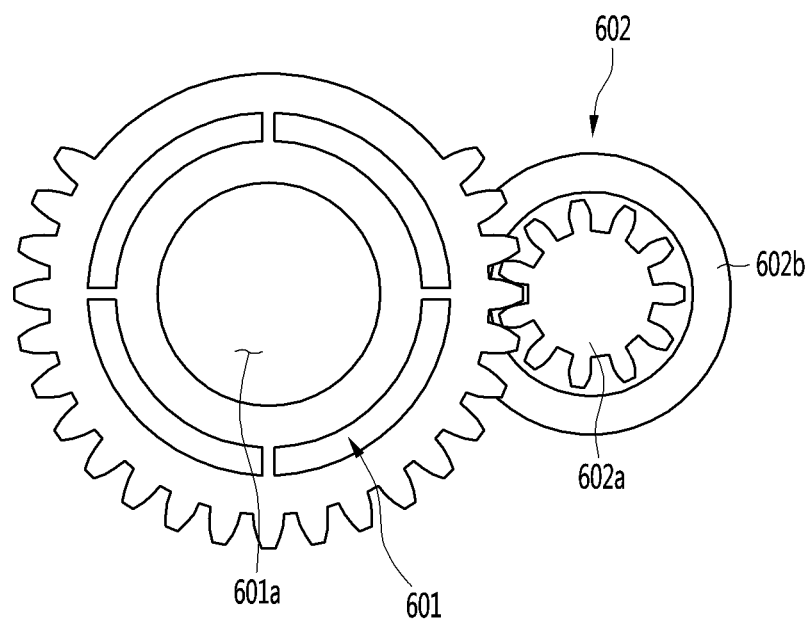
FIG. 10 is a view showing a connection gear engaged with a gear damper.
Figure 11:
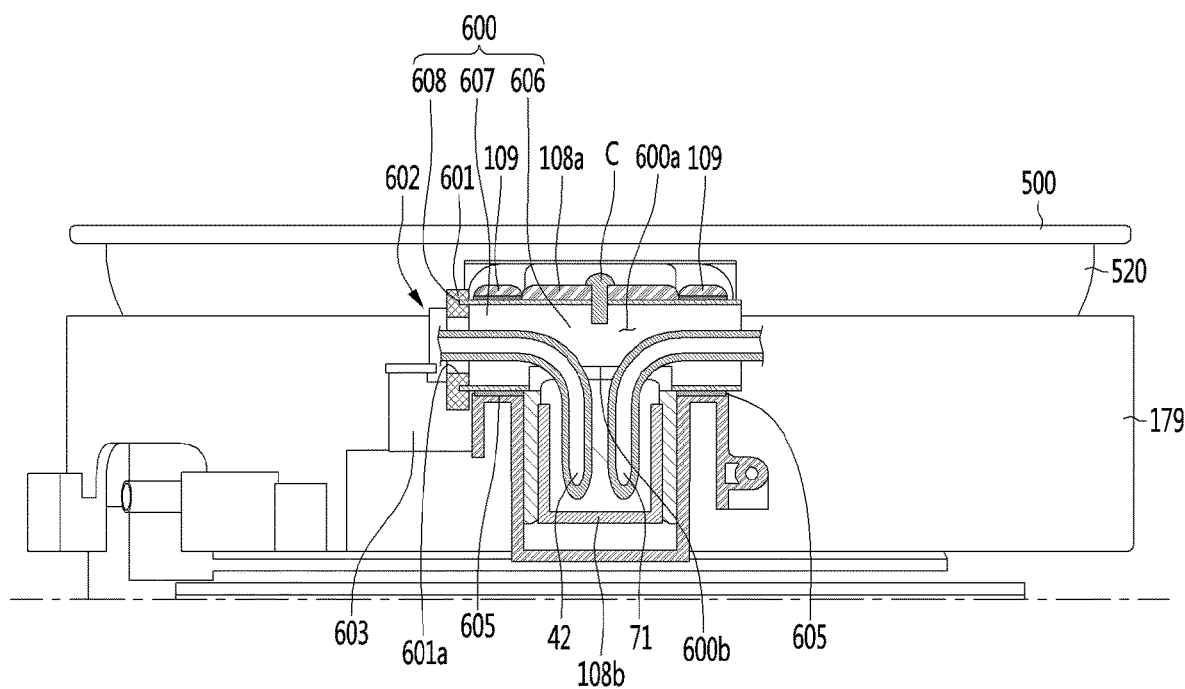
FIG. 11 is a cross-sectional view showing a hinge shaft according to an embodiment and components around the hinge shaft.
Figure 12:
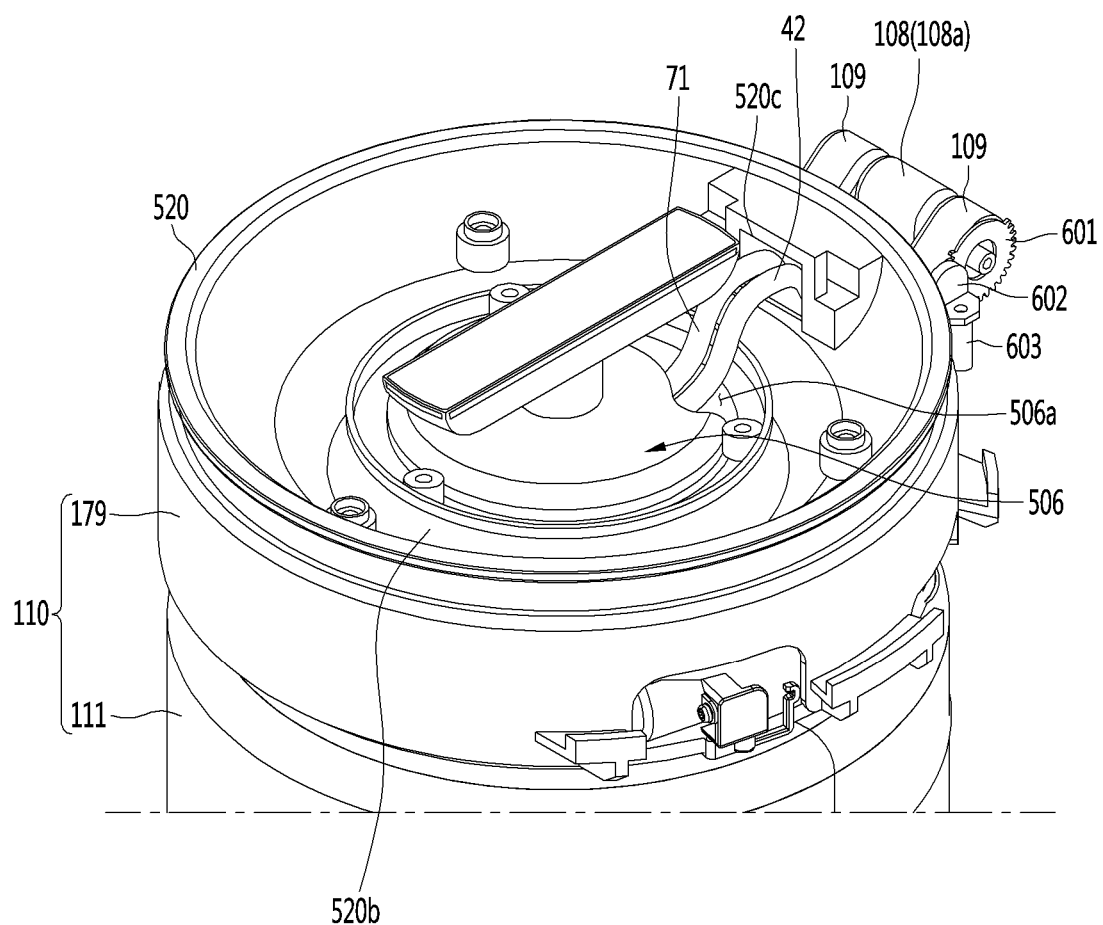
FIG. 12 is a view showing the fermentation module with a top cover removed from the fermentation lid.

FIG. 9 is a view enlarging and showing an upper portion of the fermentation module according to an embodiment. FIG. 10 is a view showing a connection gear engaged with a gear damper. FIG. 11 is a cross-sectional view showing a hinge shaft according to an embodiment and components around the hinge shaft. FIG. 12 is a view showing the fermentation module with a top cover removed from the fermentation lid.

The beverage maker according to an embodiment may include the hinge shaft 600, the rotary gear 601, and the gear damper 602. As described above, the hinge shaft 600 form a hinge shaft of the fermentation lid 107 and may rotate with the fermentation lid 107.

The hinge shaft 600 may be connected to the hinge portion 108a of the fermentation lid 107. The hinge shaft 600 may be fastened to the hinge portion 108a by a fastener C, such as a screw, in a state in which it is inserted in the hinge portion 108a. Accordingly, the hinge shaft 600 may rotate with the hinge portion 108a without idling in the hinge portion 108a.

The hinge portion 108a of the fermentation lid 107 may be positioned between a pair of shaft supports 109 formed at the fermenter 110, that is, the lid seat body 179. That is, the pair of shaft supports 109 may rotatably support the hinge shaft 600 with the hinge portion 108a therebetween.

The hinge shaft 600 may be inserted in any one of the pair of shaft supports 109 and may be inserted in the other of the pair of shaft supports 109 through the hinge portion 108a of the fermentation lid 107. Further, the rotary gear 601 engaged with the gear damper 602 may be connected to the hinge shaft 600.

The hinge shaft 600 may include a shaft portion 606 positioned in the hinge portion 108a, a pair of extending portions 607 positioned inside of the pair of shaft supports 109, and a gear connecting portion 608 positioned outside of the pair of shaft supports 109 and connected with the rotary gear 601. A fastening hole in which the fastener C may be fastened may be formed at the shaft portion 606. Further, a channel through-hole 600b that connects a shaft hole 600a to the internal space of the hinge connecting portion 108b may be formed at the shaft portion 606.

The pair of extending portions 607 may extend at both ends of the shaft portion 606, respectively. The pair of extending portions 607 may rotate inside of the shaft supports 109.

The gear connecting portion 608 may extend from any one of the pair of extending portions 607. The gear connecting portion 608 may be positioned outside of the pair of shaft supports 109 and may be connected with the rotary gear 601.

The rotary gear 601 may rotate with the hinge shaft 600 and may be engaged with the gear damper 602. The rotary gear 601 may be fitted on an outer circumference of the gear connecting portion 608 or may be connected to an end of the gear connecting portion 608. When an end of the gear connecting portion 608 is fitted and connected to the rotary gear 601, a through-hole that communicates with the shaft hole 600a may be formed at the rotary gear 601. Accordingly, the channels 42 and 71 may be inserted in the shaft hole 600a through the through-hole.

The gear damper 602 may be disposed on the fermenter 110. That is, a damper mount 603 may be disposed on an outer side of a rear portion of the lid seat body 179 and the gear damper 602 may be mounted on the damper mount 603.

The gear damper 602 may include a damper main body 602b mounted on the damper mount 603 and filled with oil, and a rotor 602a rotatably connected with the damper main body 602b and engaged with the connecting gear 601. A diameter of the rotor 602a may be smaller than a diameter of the connecting gear 601. The detailed configuration and operation of the gear damper 602 is well known in the art, such as in Korean Patent No. KR10-2007-0115097A, which is hereby incorporated by reference, so they are not described in detail herein.

A torque of the fermentation lid 107 and the hinge shaft 600 may be attenuated by the connecting gear 601 engaged with the gear damper 602. Accordingly, rapid opening/closing of the fermentation lid 107 may be prevented, and shock and noise may be minimized. Further, there is an advantage that shaking in a rotational direction of the fermentation lid 107 may be minimized.

The shaft hole 600a in which the channels 42 and 71 may be inserted, and the channel through-hole 600b communicating with the shaft hole 600a may be formed at the hinge shaft 600. The shaft hole 600a may be elongated in a longitudinal direction of the hinge shaft 600. That is, the hinge shaft 600 may have a predetermined outer diameter and inner diameter with respect to the longitudinal direction.

The channels 42 and 71 may be inserted into the shaft hole 600a from outside of the fermenter 110 and the fermentation lid 107. That is, the second main channel 42 may be inserted into the shaft hole 600a through a first end of the hinge shaft 600 and the gas discharge channel 71 may be inserted into the shaft hole 600a through a second end of the hinge shaft 600.

The channel through-hole 600b may be formed at the shaft portion 606 of the hinge shaft 600 and may be formed toward the lid body 520. The channel through-hole 600b may connect the shaft hole 600a to an internal space of the hinge connecting portion 108b. Further, the opening 520c formed at the lid body 520 may communicate with the channel through-hole 600b through the internal space of the hinge connecting portion 108b.

Accordingly, the channels 42 and 71 inserted in the shaft hole 600a may be inserted into the lid body 520 sequentially through the channel through-hole 600b, the internal space of the hinge connecting portion 108b, and the opening 520c. The channels 42 and 71 inserted in the lid body 520 may enter the lid inner space S6 (see FIG. 7) through the open portion 506a formed at the upper cover 506, and may be connected to the channel connecting portion 515.

A bushing 604 in contact with the outer circumference of the hinge shaft 600 may be disposed on an inner circumference of the pair of shaft supports 109. The bushing 605 may be disposed between the inner circumference of the pair of shaft supports 109 and an outer circumference of the pair of extending portions 607.

The bushing 605 may be formed, for example, by insert injection-molding for the pair of shaft supports 109 and the hinge shaft 600, and the bushing 605 may minimize assembly error between the pair of shaft supports 109 and the hinge shaft 600. Accordingly, the hinge shaft 600 may be firmly fixed to the pair of shaft supports 109, so shaking in a radial direction of the hinge shaft 600 may be minimized.

Figure 13A:
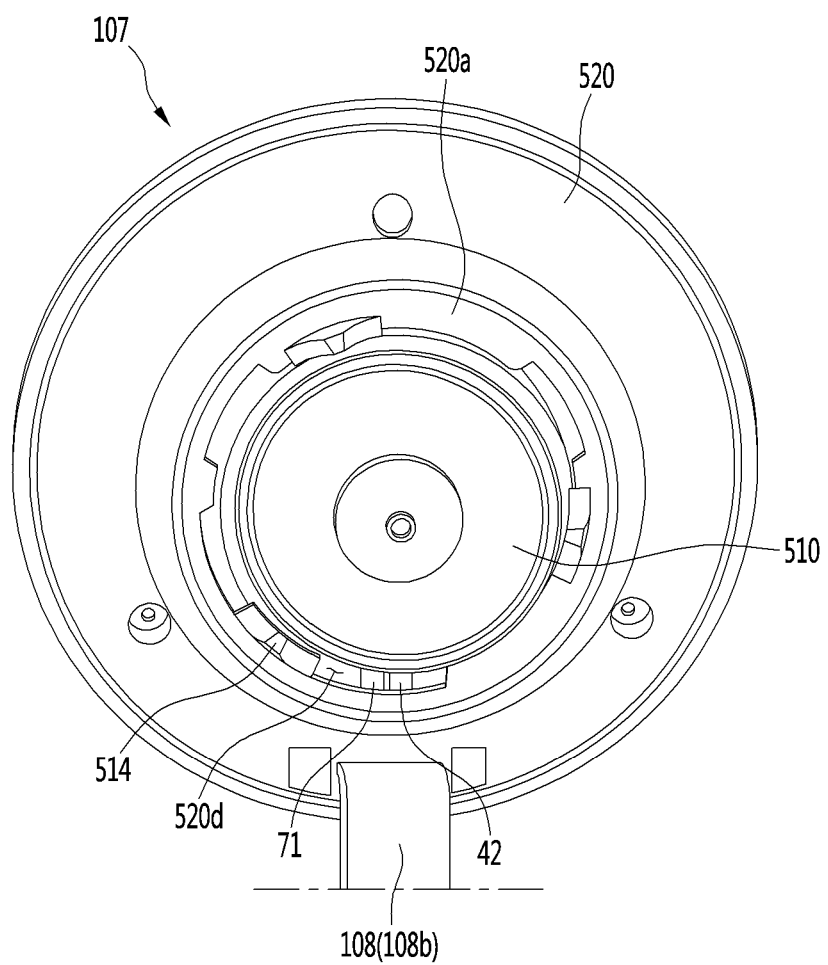
FIG. 13A is a view showing a lower portion of the fermentation lid when an upper cover accommodation portion is not formed, as a comparative example.
Figure 13B:
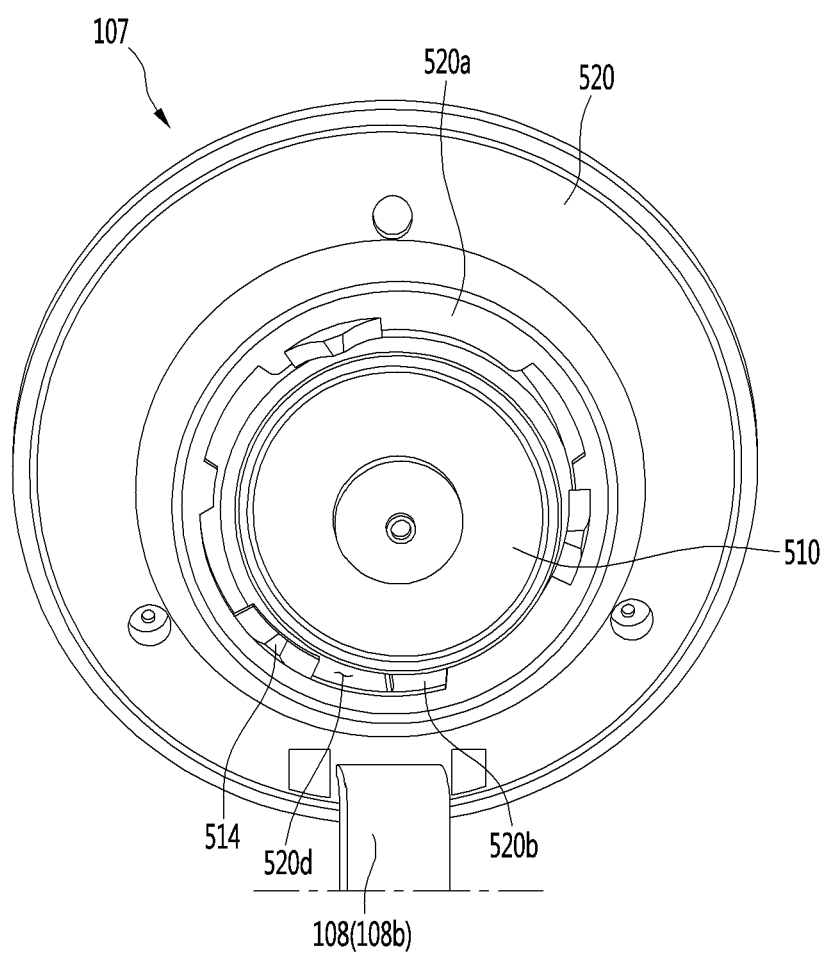
FIG. 13B is a view showing the lower portion of the fermentation lid according to an embodiment.

FIG. 13A is a view showing a lower portion of the fermentation lid when an upper cover accommodation portion is not formed, as a comparative example. FIG. 13B is a view showing a lower portion of the fermentation lid according to an embodiment.

As described above, the upper cover anti-separating portion 520a and the upper cover accommodating portion 520b may be formed at the lid body 520. The upper cover anti-separating portion 520a may have a substantially circular ring plate shape. An inner circumference of the upper cover anti-separating portion 520a may face an outer circumference of the hollow body 510.

A plurality of avoiding grooves 520d may be formed at the upper cover anti-separating portion 520a. The avoiding grooves 520d may be formed on the inner circumference of the upper cover anti-separating portion 520a.

When the hollow body 510 is mounted on the lid body 520, the locking portions 514 formed on the outer circumference of the hollow body 510 may move under the lid body 520 inside of the lid body 520 through the avoiding grooves 520d.

The upper cover accommodating portion 520b (see FIG. 7) may protrude upward from the upper cover anti-separating portion 520a. A height to an upper end of the upper cover accommodating portion 520b may be higher than or the same as a height to a top surface of the upper cover 506 from a top surface of the upper cover anti-separating portion 520a.

The upper cover 506 may be accommodated in the upper cover accommodating portion 520b. Further, the upper cover accommodating portion 520b may prevent the channels 42 and 71 from being exposed through the avoiding grooves 520d under the fermentation lid 107.

As shown in FIG. 13A, when the upper cover accommodating portion 520b is not formed at the lid body 520, the channels 42 and 71 may be exposed between the avoiding grooves 520d and outer circumference of the hollow body 510. Exposed portions of the channels 42 and 71 may be portions between the opening 520c of the lid body 520 (see FIG. 12) and the open portion 506a of the upper cover 506. However, as shown in FIG. 13B, when the upper cover accommodating portion 520b is formed at the lid body 520, the channels 42 and 71 are covered by the upper cover accommodating portion 520b, so they may not be exposed between the avoiding grooves 520d and the hollow body 510. Accordingly, there is an advantage that it is possible to improve design quality of the fermentation lid 107 and provide an aesthetic feeling to a user.

Embodiments disclosed herein provide a beverage maker a fermentation lid of which may be prevented from rapidly opening and closing.

A beverage maker according to an embodiment may include a fermenter having an opening; a fermentation lid hinged to the fermenter and configured to open and close the opening from above; a hinge shaft connected to the fermentation lid and configured to rotate with the fermentation lid; a rotary gear connected to the hinge shaft; and a gear damper provided at the fermenter and engaged with the rotary gear. The fermentation lid may include a lid body, and a hinge portion positioned outside of the lid body and connected with the hinge shaft. The fermenter may include a lid seat body in which the lid body may be seated and on which the gear damper may be installed, and a pair of shaft support portions or supports formed on the lid seat body and that support the hinge shaft with the hinge portion therebetween such that the hinge shaft may rotate.

The beverage maker may further include a damper mount disposed on an outer surface of the lid seat body and on which the gear damper may be mounted. The hinge shaft may include a shaft portion positioned inside of the hinge portion; a pair of extending portions that extends from both ends of the shaft portion and positioned inside of the pair of shaft support portions; and a gear connecting portion that extends from any one of the pair of extending portions, positioned outside of the pair of shaft support portions, and connected with the rotary gear.

The beverage maker may further include a bushing provided between an inner circumference of the pair of shaft support portions and an outer circumference of the pair of extending portions. The beverage maker may further include a fluid supply module disposed outside of the fermenter and the fermentation lid and configured to supply a fluid into a fermentation space in the fermenter through a channel.

The beverage maker may further include a material supplier disposed outside of the fermenter and the fermentation lid and configured to supply a material into a fermentation space in the fermenter through a channel. The beverage maker may further include an air injector disposed outside of the fermenter and the fermentation lid and configured to inject air into a fermentation space in the fermenter through a channel.

The beverage maker may further include a beverage dispenser disposed outside of the fermenter and the fermentation lid and configured to dispense a beverage made in a fermentation space in the fermenter through a channel. The beverage maker may further include a gas discharge valve disposed outside of the fermenter and the fermentation lid and configured to discharge gas from a fermentation space in the fermenter through a channel.

The shaft may include a shaft hole in which the channel may be inserted, and a channel through-hole that communicates with the shaft hole, formed toward the lid body, and passing the channel. An opening that communicates with the channel through-hole may be formed at the lid body.

The fermentation lid may further include a channel connecting portion positioned inside of the lid body, that communicates with the fermentation space, and connected with the channel through the opening. A torque of the fermentation lid and the hinge shaft may be attenuated by the connecting gear engaged with the gear damper. Accordingly, rapid opening/closing of the fermentation lid may be prevented, and shock and noise may be minimized. Further, there is an advantage that shaking in a rotational direction of the fermentation lid may be minimized.

The bushing may minimize assembly error between the shaft hinge portions and the hinge shaft. Accordingly, the hinge shaft may be firmly fixed to the shaft hinge portions, so shaking in a radial direction of the hinge shaft may be minimized.

Channels may be easily inserted into the fermentation lid through the shaft hole formed at the shaft and the channel through-hole. Further, the fermentation lid that is opened/closed does not interfere with the channels, so twist or torsion of the channels may be minimized.

As an opening that communicates with the channel through-hole is formed at the lid body, the channel may be easily inserted into the lid body and connected to the channel connecting portion. Accordingly, it is possible to inject fluid, such as water, air, and a material into the fermentation space through the channel and take out the finished beverage made in the fermentation space.

The above description merely explains the spirit and embodiments may be changed and modified in various ways without departing from the spirit by those skilled in the art. Accordingly, the embodiments described herein are provided merely not to limit, but to explain the spirit, and the spirit is not limited by the embodiments. A protective range of embodiments should be construed by the following claims and the scope and spirit should be construed as being included in the patent right.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
   a fermenter having an opening;
   a fermentation lid hinged to the fermenter and configured to open and close the opening from above;
   a hinge shaft connected to the fermentation lid and configured to rotate with the fermentation lid;
   a rotary gear connected to the hinge shaft;
   a gear damper provided at the fermenter and engaged with the rotary gear; and
   a gas discharge valve disposed outside of the fermenter and the fermentation lid and configured to discharge gas from a fermentation space in the fermenter through a gas discharge channel, wherein the hinge shaft includes:
      a shaft hole in which the gas discharge channel is inserted, and
      a channel through-hole that communicates with the shaft hole, formed to extend toward the fermentation lid, and through which the gas discharge channel passes.

2. The beverage maker of claim 1, wherein the fermentation lid includes:
   a lid body; and
   a hinge portion positioned outside of the lid body and connected with the hinge shaft, and wherein the fermenter includes:
      a lid seat body in which the lid body is seated and on which the gear damper is installed; and
      a pair of shaft supports formed on the lid seat body and that support the hinge shaft with the hinge portion therebetween such that the hinge shaft rotates.

3. The beverage maker of claim 2, further comprising a damper mount provided on an outer surface of the lid seat body and on which the gear damper is mounted.

4. The beverage maker of claim 2, wherein the hinge shaft includes:
   a shaft portion positioned inside of the hinge portion;
   a pair of extending portions that extends from both ends of the shaft portion and is positioned inside of the pair of shaft supports; and
   a gear connecting portion that extends from any one of the pair of extending portions, is positioned outside of the pair of shaft supports, and is connected with the rotary gear.

5. The beverage maker of claim 4, further comprising a bushing provided between an inner circumference of the pair of shaft supports and an outer circumference of the pair of extending portions.

6. The beverage maker of claim 2, further comprising a fluid supply module disposed outside of the fermenter and the fermentation lid and configured to supply a fluid into the fermentation space in the fermenter through a main channel.

7. The beverage maker of claim 2, further comprising a material supplier disposed outside of the fermenter and the fermentation lid and configured to supply a material into the fermentation space in the fermenter through a main channel.

8. The beverage maker of claim 2, further comprising an air injector disposed outside of the fermenter and the fermentation lid and configured to inject air into the fermentation space in the fermenter through a main channel.

9. The beverage maker of claim 2, further comprising a beverage dispenser disposed outside of the fermenter and the fermentation lid and configured to release a beverage made in the fermentation space in the fermenter through a main channel.

10. The beverage maker of claim 1, wherein an opening that communicates with the channel through-hole is formed at the fermentation lid.

11. The beverage maker of claim 10, wherein the fermentation lid further includes a channel connecting portion positioned inside of the lid body, that communicates with the fermentation space, and is connected with the gas discharge channel through the opening.

* * * * *